United States Patent
Wang

[19]

[11] Patent Number: 6,148,853
[45] Date of Patent: Nov. 21, 2000

[54] DAMPER VALVE FOR HYDRAULIC POWER STEERING DEVICE

[75] Inventor: Chaojiu Wang, Tochigi, Japan

[73] Assignee: Showa Corporation, Gyoda, Japan

[21] Appl. No.: 09/389,683

[22] Filed: Sep. 2, 1999

[30] Foreign Application Priority Data

Sep. 4, 1998 [JP] Japan .................................. 10-250536

[51] Int. Cl.[7] ................................................. F16K 17/18
[52] U.S. Cl. ................................... 137/493.6; 137/493.8;
188/282.5; 188/282.6
[58] Field of Search ............................ 137/493.8, 493.6;
188/281, 282.5, 282.6

[56] References Cited

U.S. PATENT DOCUMENTS

| | | |
|---|---|---|
| 2,748,898 | 6/1956 | deCarbon . |
| 4,352,417 | 10/1982 | Stinson ................................. 137/513.5 |
| 4,428,567 | 1/1984 | Fournales .............................. 267/64.26 |
| 5,584,226 | 12/1996 | Roemer et al. ........................... 91/447 |

FOREIGN PATENT DOCUMENTS 2729982  7/1995  Japan .

*Primary Examiner*—Stephen M. Hepperle
*Attorney, Agent, or Firm*—Orum & Roth

[57] ABSTRACT

A damper valve for a hydraulic power steering device is disposed on a hydraulic oil circuit for connecting an oil passage changing-over valve in a gear box and left and right oil chambers of a power cylinder, and is provided with a partition plate member for partitioning the interior of a valve casing into two valve chambers. The partition plate member is formed at equal intervals along a peripheral direction with a plurality of through holes. A first valve spring plate for opening/closing every other one of the plurality of through holes is fixed to one wall face of the partition plate member facing a first valve chamber of the two valve chambers positioned on the oil passage changing-over valve side, while a second valve spring plate for opening/closing the other every other one of the plurality of through holes is fixed to the other wall face of the partition plate member facing a second valve chamber of the two valve chambers positioned on the power cylinder side. The outer diameter of a first flat washer 38 for pressing the first valve spring plate is made larger than that of a second flat washer which holds the second spring plate, and the spring force of the first valve spring plate is made stronger than that of the second spring plate.

13 Claims, 9 Drawing Sheets

DAMPER VALVE FOR HYDRAULIC POWER STEERING DEVICE

BACKGROUND OF THE INVENTION

1. Field of the Invention

The present invention relates to a damper valve for a hydraulic power steering device, and in particular to a damper valve for a hydraulic power steering device whose structure is simplified and whose manufacturing cost is reduced.

2. Description of the Related Art

A hydraulic power steering device used for a vehicle is conventionally provided with a damper valve in order to improve steering stability at high vehicle speeds and to prevent occurrence of shimmy phenomenon, kickback phenomenon or the like. One such damper valve is disclosed in FIG. 11 (refer to Japanese Patent No. 2729982 Official Gazette).

A damper valve 030 of this type is provided with a partition plate member (valve holding member) 032 formed in a perforated plate-shape, where opening/closing of through holes 035 of the partition plate member 032 through which hydraulic oil passes can be controlled by a valve spring plate 036 supported on an end face of the partition plate member 032 via a pin 041 or a valve plate 037 subjected to spring action. The partition plate member 032 is provided within a valve casing 030 fixedly, so as not to be lost. Also, the valve spring plate 036 or the valve plate 037 is fixedly mounted to the partition wall member 032 so as not to become separated therefrom.

The pin 041 is provided at a center of the partition plate member 032, and comprises a large diameter portion and a small diameter portion. The pin 041 is positioned to the partition plate member 032 at a step portion between the large diameter portion and the small diameter portion, and a coil compression spring 050 is interposed between a flange of an end portion of the large diameter portion and an annular plate portion of the valve plate 037 to press the valve plate 037 on one end of the partition plate member 032. The valve plate 037 has a cylindrical portion protruded from its annular plate portion, the cylindrical portion being guided in a sliding manner by the large diameter portion of the pin 041. Also, a rivet-shape end portion (bending portion) of the small diameter portion of the pin 041 presses the valve spring plate 036 on the other end face of the partition plate member 032 via an annular plate 038.

A bored oil passage 051 is formed in the through holes 035 of the partition plate member 032 so as to secure a remaining area through which hydraulic oil can pass even when the valve spring plate 036 and the valve plate 037 are positioned at positions where they dose the through holes 035. Reference numeral 031 denotes a casing of the damper valve 030 and reference numeral 031b denotes a communication hole formed in the casing 030.

As the conventional damper valve is configured in the above manner, when vibrations are transmitted to a power cylinder from a road wheel side (not shown) via a tie-rod, hydraulic oil in a circuit connecting an oil passage changing-over valve and the power cylinder tends to flow in the damper valve 030 in a direction of arrow in FIG. 11 to return back toward the oil passage changing-over valve. However, as spring force of the valve spring plate 036 is set larger than the biasing force of the compression spring 050 pressing the valve plate 037, passage of the through holes 035 is opened by the valve spring plate 036 only in a slight amount, so that oil is subjected to flow resistance from the passage when it flows in the passage, and kinetic energy of the hydraulic oil is consumed.

As a result, since vibrations transmitted to the power cylinder from the road wheel side are damped and they are prevented from being transmitted to the steering wheel via the oil passage changing-over valve, stability and comfort of steering operation are not degraded. On the contrary, when hydraulic oil flows in a direction opposite of the arrow in FIG. 11, the valve plate 037 opens the passageway of the through holes 035 to a relatively large extent so that hydraulic oil is not prevented from being supplied to the power cylinder.

In the conventional device, however, since the structure of the partition plate member 032 or the pin 041 becomes complicated, two valve plates must be prepared, as the valve spring plate 036 and the valve plate 037, and a coil compression spring 050 or the like is required. The structure of the damper valve becomes complicated, and assembling thereof deteriorates, so that manufacturing cost of the damper valve is increased.

SUMMARY OF THE INVENTION

An object of the present invention is to solve the above problems in the conventional damper valve and to provide a damper valve for a hydraulic power steering device whose structure is simplified, whose manufacturing and assembling are facilitated and whose manufacturing cost is reduced.

The present invention relates to a damper valve for a hydraulic power steering device where the above problems have been solved. An aspect of the present invention is a damper valve for a hydraulic power steering device which is disposed in a hydraulic oil circuit, for connecting an oil passage changing-over valve disposed in a gear box and left and right oil chambers of a power cylinder to each other, and which is provided with a partition plate member for partitioning the interior of a valve casing into two valve chambers. A plurality of through holes are formed in the partition plate member at equal intervals along a peripheral direction thereof. A first valve spring plate for opening/closing alternating, or every other one of the plurality of through holes, is fixed to one side wall of the partition plate member facing a first valve chamber of the two valve chambers positioned on a side of the oil passage changing-over valve, a second valve spring plate for opening/closing alternating, or the other every other one of the plurality of through holes, is fixed to the other wall of the partition plate member facing a second valve chamber of the two valve chambers positioned on a side of the power cylinder. The spring force of the first valve spring plate is larger than the spring force of the second valve spring plate.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

FIG. 7A is a vertical sectional view of the partition plate member, FIG. 7B is a left side view in FIG. 7A, and FIG. 7C is a right side view in FIG. 7A:

FIG. 8A is a vertical sectional view of the partition plate member, FIG. 8B is a left side view in FIG. 8A, and FIG. 8C is a right side view in FIG. 8A:

FIG. 8A is a vertical sectional view of the partition plate member, FIG. 9B is a left side view in FIG. 9A, and FIG. 9C is a right side view in FIG. 9A:

DESCRIPTION OF THE PREFERRED EMBODIMENTS

An embodiment (embodiment 1) of the present invention will be explained with reference to FIGS. 1 to 6.

Figure 1:
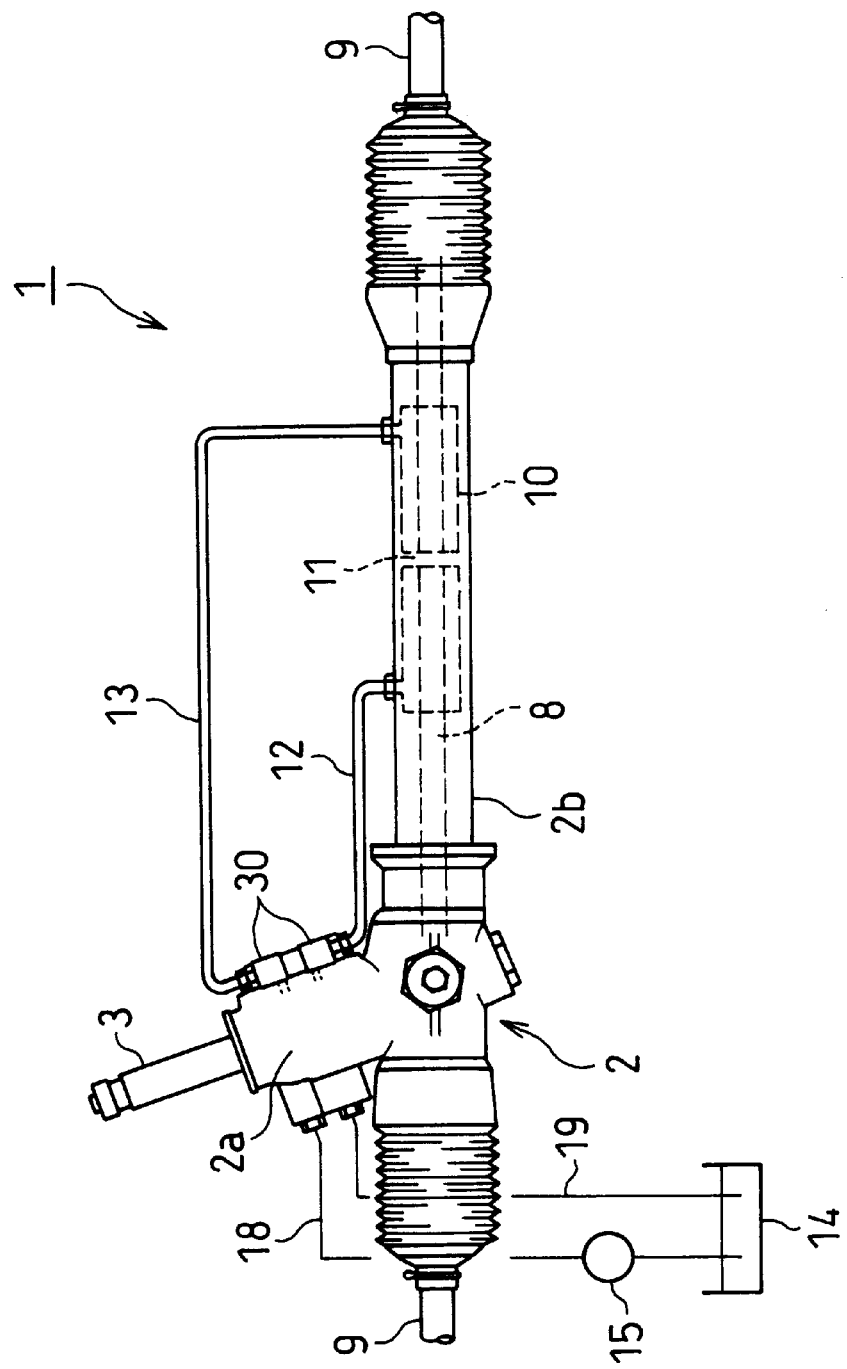
FIG. 1 is an entire configuration view of a hydraulic power steering device including a damper valve according to an embodiment (embodiment 1) of the present invention.
Figure 2:
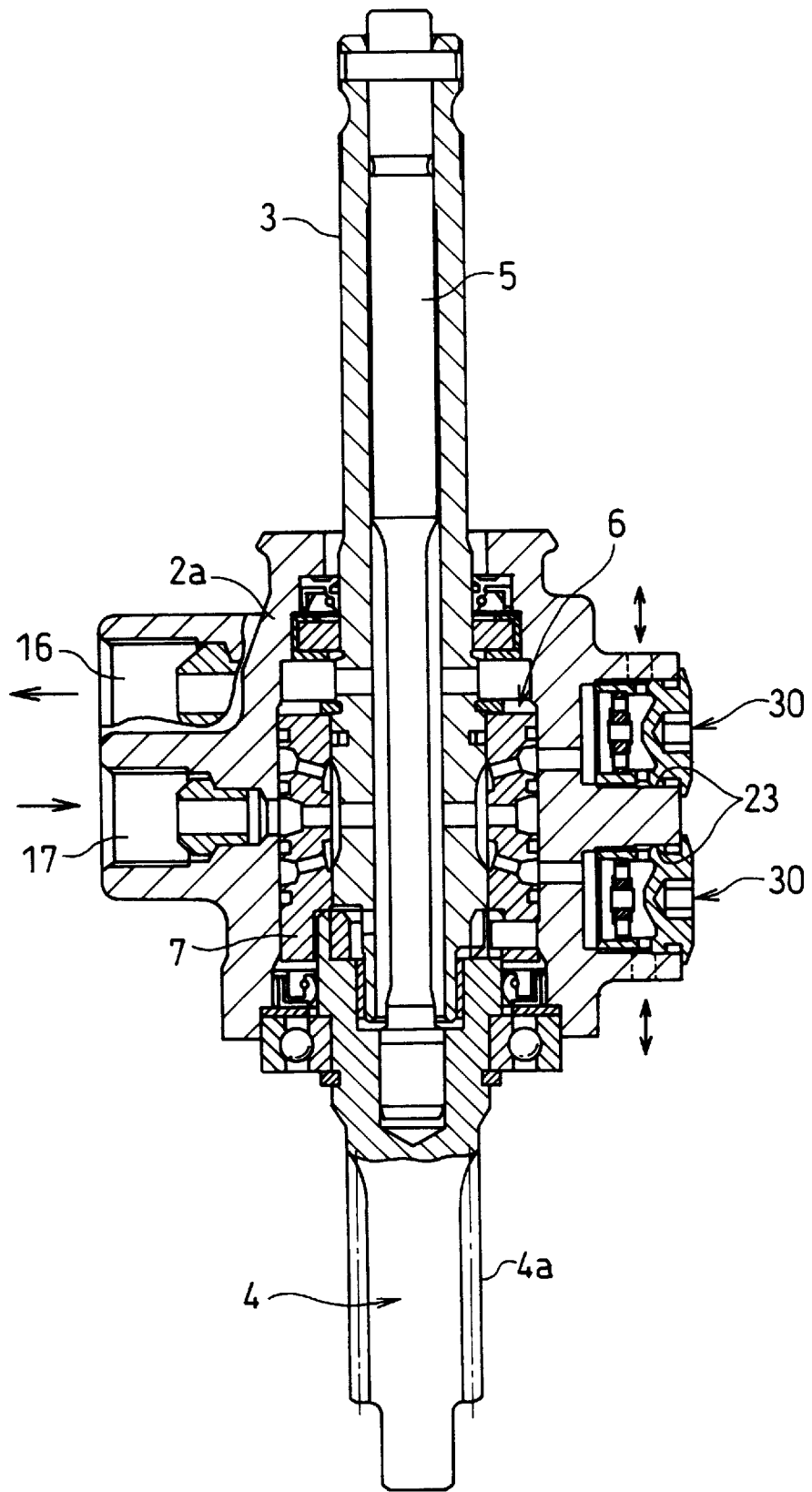
FIG. 2 is a longitudinal sectional view of an oil passage changing-over valve accommodating portion of a gear box of the hydraulic power steering device in FIG. 1.
Figure 3:
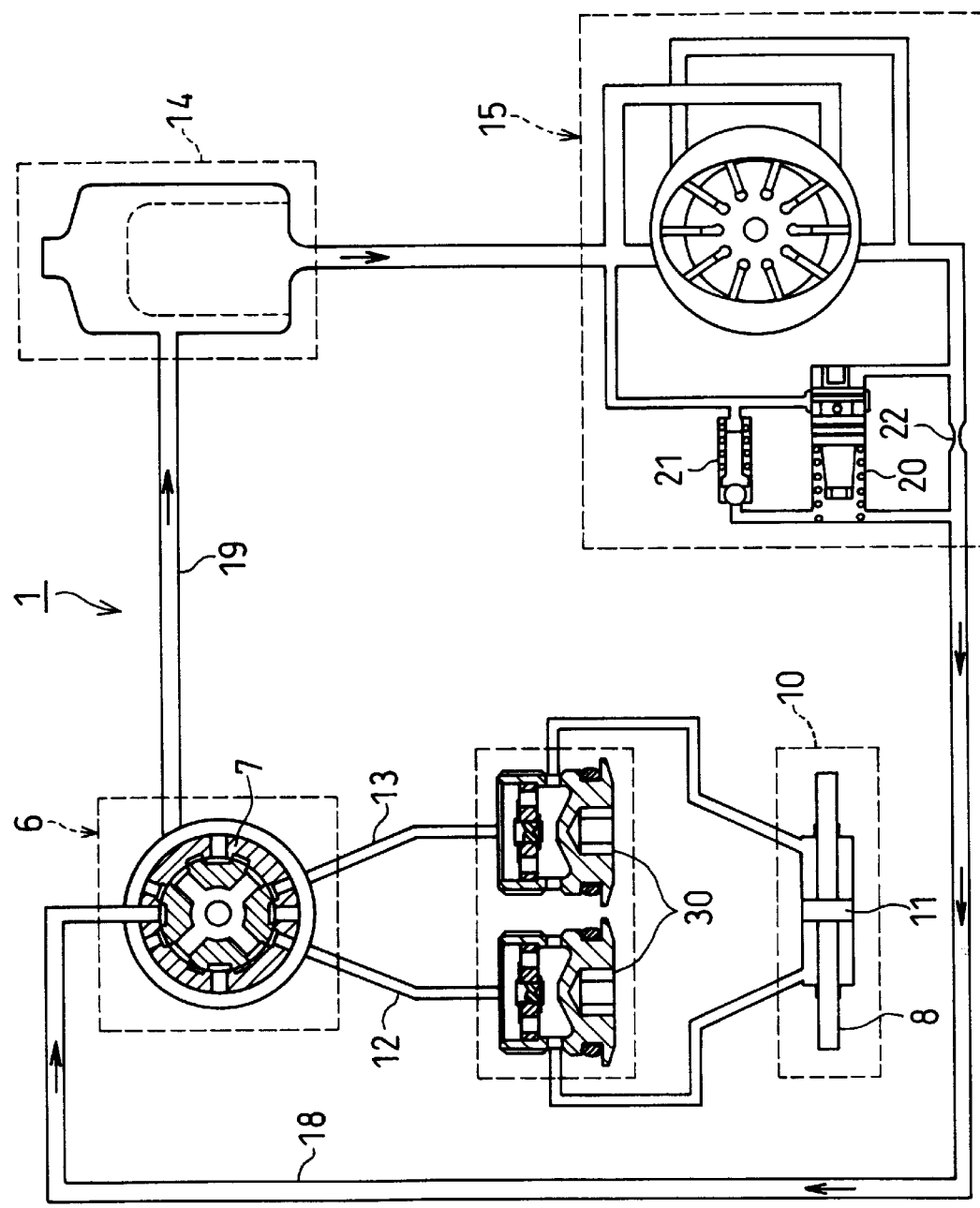
FIG. 3 is a schematic configuration view of the hydraulic power steering device in FIG. 1 whose portions are sectioned.
Figure 4A:
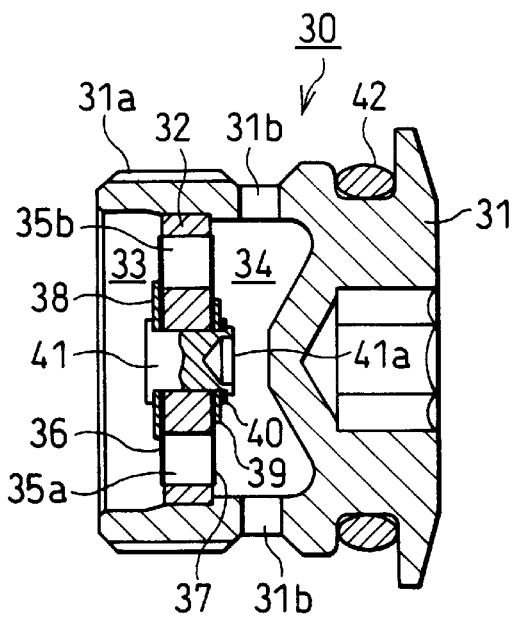
FIG. 4A is a vertical sectional view of the damper valve in FIG. 1.
Figure 4B:
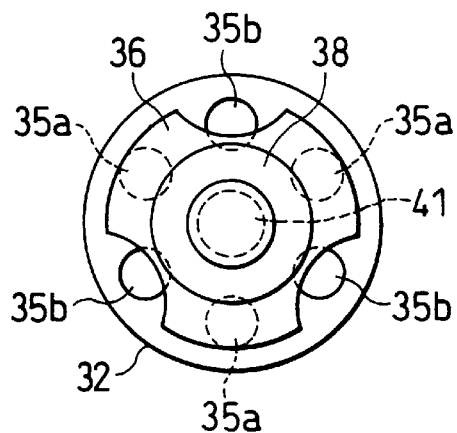
FIG. 4B is a left side view of a partition plate member of the damper valve in FIG. 1.
Figure 4C:
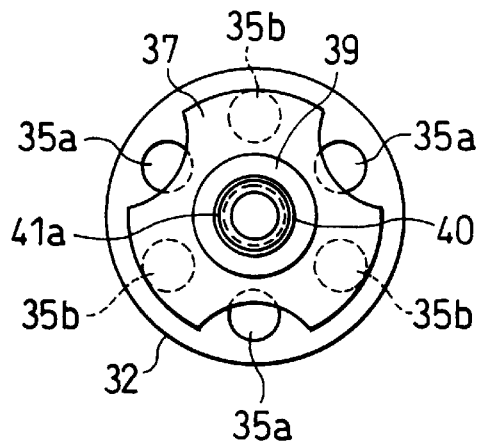
FIG. 4C is a right side view of the partition plate member of the damper valve in FIG. 1.
Figure 5:
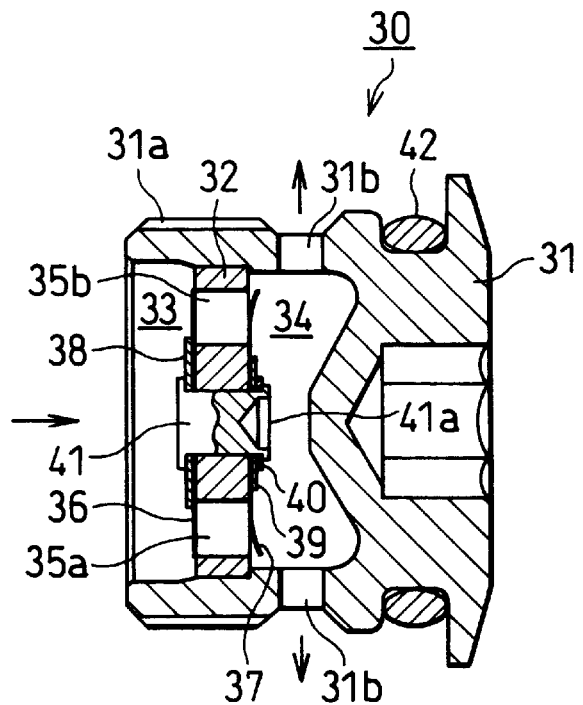
FIG. 5 is a vertical sectional view of the damper valve of FIGS. 4A to 4C in an operational state.
Figure 6:
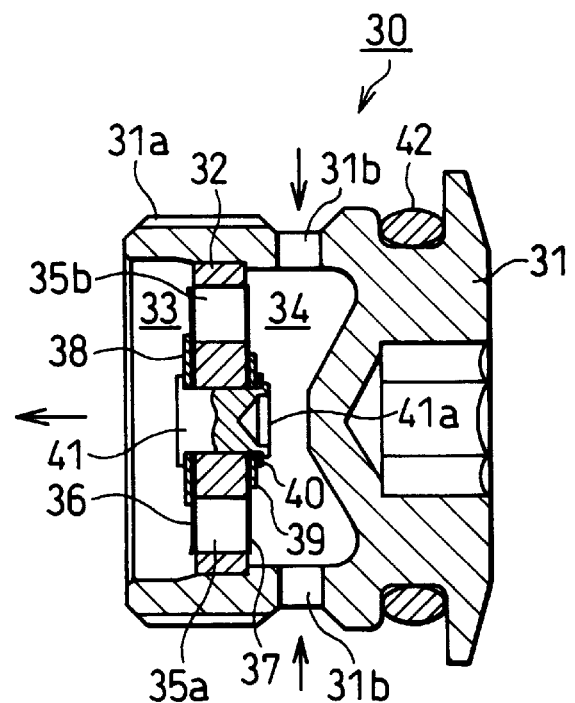
FIG. 6 is a vertical sectional view of the damper valve of FIGS. 4A to 4C in another operational state.

FIG. 1 is an entire configuration view of a hydraulic power steering device having a damper valve in an embodiment 1; FIG. 2 is a vertical sectional view of an oil passage changing-over valve accommodating portion of a gear box of the hydraulic power steering device in FIG. 1; FIG. 3 is a sectional configuration view of the hydraulic power steering device in FIG. 1; FIG. 4A is a vertical sectional view of the damper valve in FIG. 1, FIG. 4B is a left side view of a partition plate member of the damper valve in FIG. 1, and FIG. 4C is a right side view of the partition plate member of the damper valve in FIG. 1; FIG. 5 is a vertical sectional view of the damper valve of FIGS. 4A to 4C in an operational state; FIG. 6 is a vertical sectional view of the damper valve of FIGS. 4A to 4C in another operational state.

In FIGS. 1 to 3, a hydraulic power steering device 1 to which damper valves 30 of the embodiment 1 are applied is a rack and pinion type power steering device where an input shaft 3 coupled to a steering wheel of a vehicle (not shown) is coupled to an output shaft (pinion shaft) 4 via a torsion bar 5 within an oil passage changing-over valve accommodating portion 2a of a gear box 2. A rack shaft 8 having a rack meshing with a pinion 4a formed on the output shaft 4 is accommodated in a rack shaft and power cylinder accommodating portion 2b of the gear box 2 slidably in left and right directions in FIG. 1.

A pair of left and right tie-rods 9, 9 are respectively connected to both ends of the rack shaft 8, and a power piston 11 of the power cylinder 10 accommodated in the rack shaft and power cylinder accommodating portion 2b is connected to an intermediate portion of the rack shaft 8. Accordingly, the rack shaft 8 also serves as a rod (a piston rod) of the power piston 11.

In the oil passage changing-over valve accommodating portion 2a of the gear box 2, an oil passage changing-over valve 6 (rotary valve) is accommodated. A sleeve 7 in the oil passage changing-over valve 6 is rotated according to an amount of distortion of the torsion bar 5, namely a relative rotation amount between the input shaft 3 and the output shaft 4, so that hydraulic oil fed by a hydraulic oil pump 15 with pressure in the oil passage changing-over valve accommodating portion 2a via a hydraulic oil supply passage 18 and an oil supply port 16 is supplied to one of the left and right oil chambers of the power cylinder 10 via a supply passage in the oil passage changing-over valve 6 and a pressure pipe 12 or a pressure pipe 13. Hydraulic oil within the other of the left and right oil chambers of the power cylinder 10 is returned back therefrom to a reservoir tank 14 via the pressure pipe 12 or the pressure pipe 13, and a return passage within the oil passage changing-over valve 6, an oil discharge port 17 and a hydraulic return passage 19.

The oil pump 15 is connected to a crankshaft of an internal combustion engine via a transmission mechanism (not shown), and is rotated at the same rotation speed as that of the internal combustion engine. As shown schematically in FIG. 3, the oil pump 15 is provided with a flow rate control valve 20, a relief valve 21 and a fixed orifice 22. The oil pump 15 operates in cooperation with these members to gradually increase the discharging amount of hydraulic oil according to the rotation speed until the rotation speed reaches a predetermined middle rotation speed, thereby discharging hydraulic oil in an amount at a constant relatively high level at the predetermined middle rotation speed, and then gradually decreasing the discharging amount of hydraulic oil, thereby discharging hydraulic oil in an amount at a constant low level when the rotation speed exceeds the predetermined rotation speed.

Accordingly, when the pinion 4a meshes with the rack of the rack shaft 8 so that the rack shaft 8 is moved left or right, the tie-rods 9, 9 together are moved left or right according to the left or right movement of the rack shaft 8 to turn the left and right road wheels, and the tie-rods 9,9 together are moved left or right according to left or right movement of the piston 11 of the power cylinder 10 produced by hydraulic oil pressure to urge turning of the left and right road wheels in an overlapping manner based upon the steering assistant force. Thereby, force for operating the steering wheel is reduced.

Two damper valves 30, 30 are mounted on a casing of the changing-over valve accommodating portion 2a of the gear box 2. Male screw portions 31a, 31a at peripheries of the two damper valves 30, 30, are screwed into two screw holes 23, 23 formed on the casing, and the damper valves 30, 30 are made watertight by O-rings 42 to be mounted on the casing (refer to FIGS. 2 and 4A).

As shown better in FIG. 3, the damper valve 30, 30 is positioned in a hydraulic oil circuit (including the pressure pipe 12 and the pressure pipe 13) connecting the oil passage changing-over valve 6 and the power cylinder 10 to each other. They restrict transmission of vibrations to the steering wheel via the pressure pipe 12, the pressure pipe 13 and the oil passage changing-over valve 6, when the vibrations are transmitted to the power cylinder 10 from the road wheels during operation of a vehicle. The detailed structure is illustrated in FIG. 4.

As shown in FIGS. 2 and 4, each damper valve 30 is provided with a partition plate member 32 for partitioning the interior of a valve casing 31 into two valve chambers comprising a first valve chamber 33 positioned on a side of the oil passage changing-over valve 6 and a second valve chamber 34 positioned at a side of the power cylinder 10. The partition plate member 32 is formed 35 at equal intervals along its peripheral direction with a plurality of through holes 35.

A first valve spring plate 36 for opening/closing alternating, or every other through hole 35a out of the plurality of through holes 35 is fixed to one of the wall faces of the partition plate member 32 facing the first valve chamber 33. A second valve spring plate 37 for opening/closing alternating, or the other every other through hole 35b out of the plurality of through holes 35 is fixed to the other of the wall faces of the partition plate member 32 facing the second valve chamber 34.

As shown in FIGS. 4B and 4C, the first valve spring plate 36 and the second valve spring plate 37 are formed in one embodiment in a stone parsley-shaped contour. The valve spring plates have the same shape and the same size, and the stone parsley portions thereof cover the through holes 35. In embodiment 1, the stone parsley portions cover the through holes 35 such that the stone parsley-shape contour lines pass through just the outermost points of the through holes 35, and virtual diameters of the valve spring plates 36, 37 are determined to have a corresponding size.

The first valve spring plate 36 is pressed by a flange portion of a pin 41 passing through a central hole of the partition plate member 32 via a first flat washer 38 sandwiched between the flange portion and one wall face of the partition plate member 32. The second valve spring plate 37 is pressed by a bending portion 41a of an end portion of the pin 41 opposed to the flange portion via a second flat washer 39, and an annular plate 40 having an outer diameter smaller than that of the second flat washer 39 sandwiched between the bending portion 41a and the other wall face of the partition plate member 32.

The first flat washer 38 and the second flat washer 39 have the same thickness, and the outer diameter of the first flat washer 38 is made larger than that of the second flat washer 39. Thereby, a spring force of the first flat spring plate 36 is made stronger than that of the second flat spring plate 37.

Accordingly, when hydraulic ail is supplied from the oil passage changing-over valve 6 towards the power cylinder 10, the hydraulic oil passes through the every other through holes 35b of the through holes 35 formed on the partition plate member 32 of one damper valve 30 to press the second valve spring plate 37 and enter in the second valve chamber 34 (refer to FIG. 5). Thereafter, the hydraulic oil passes through a plurality of communication holes 31b formed in the valve casing 31 of the damper valve 30 to flow in the pressure pipe 12 or the pressure pipe 13 and to be supplied to one of the left and right oil chambers of the power cylinder 10. Hydraulic oil from the other of the left and right oil chambers of the power cylinder 10 flows through the pressure pipe 13 or the pressure pipe 12, and a plurality of communication holes 31b of the other damper valve 30, the second valve chamber 34 and the other every other through holes 35a to press the first valve spring plate 36 and to be returned back to the oil passage changing-over valve 6.

At this time, since the spring force of the second valve spring plate 37 is set to be relatively weak, the supply of hydraulic oil from the oil passage changing-over valve 6 towards the power cylinder 10 is delivered smoothly so that an expected assistant force for steering the steering wheel can be obtained. Meanwhile, since the spring force of the first valve spring plate 36 is set to be relatively strong, return of hydraulic oil from the power cylinder 10 towards the oil passage changing-over valve 6 is not delivered smoothly so that the proper damper effect can be obtained.

When vibrations from the road wheels (not shown) are transmitted the power cylinder 10 via the tie-rods 9, 9, the hydraulic oil in the pressure pipe 12 and the pressure pipe 13 connecting the ail passage changing-over valve 6 and the power cylinder 10 flows through either one of the damper valves 30, 30 from the power cylinder 10 side towards the oil passage changing-over valve 6 according to the moving direction of the piston 11. The damper valve develops the above damper effect so that the hydraulic oil is subjected to flow resistance and kinetic energy thereof disappears.

Thereby, as the vibrations transmitted from the road wheels to the power cylinder 10 are damped so that they are prevented from being transmitted to the steering wheel via the oil passage changing-over valve 6, the so-called shimmy phenomenon is suppressed. Also, occurrence of the kickback phenomenon where the steering wheel is jolted, for example, when a road wheel impacts a stone, is suppressed for the same reasons as the above. Accordingly, stability and/or comfort in steering of the steering wheel is maintained and, particularly, the unstable feeling in a neutral state of the steering wheel during a high speed running of a vehicle is counteracted.

As the present embodiment 1 is thus configured, the following effects can be obtained.

The partition plate member 32 used for the damper valve 30 is formed at equal intervals along the periphery thereof with the plurality of through holes 35, the first valve spring plate 36 for opening/closing every other one of the through holes 35a of the plurality of through holes 35 is fixed to the one wall face of the partition plate member 32 facing the first valve chamber 33, the second valve spring plate 37 for opening/closing the other every other one of the through holes 35b of the plurality of through holes 35 is fixed to the other wall face of the partition plate member 32 facing the second valve chamber 34, and the spring force of the first valve spring plate 36 is made stronger than that of the second valve spring plate 37. Also, the first valve spring plate 36 and the second valve spring plate 37 are structured by the same valve spring plate.

Figure 11:
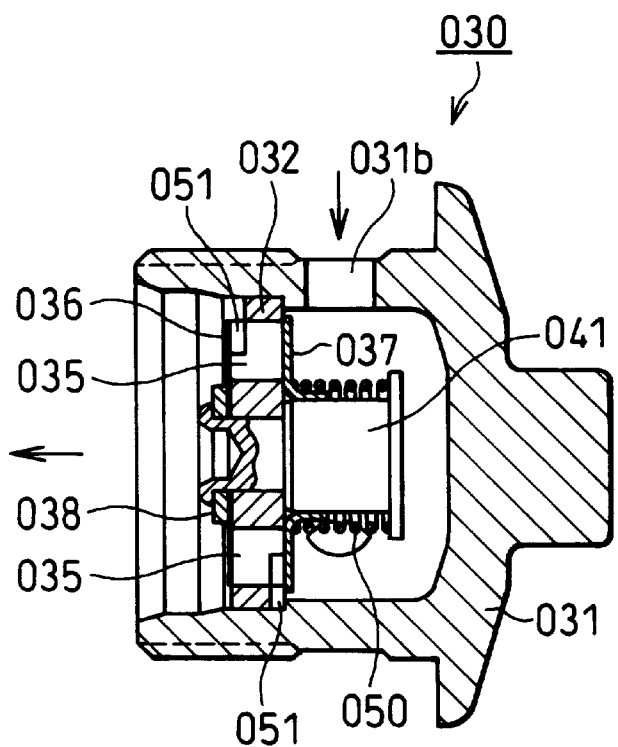
FIG. 11 is a vertical sectional view showing a conventional damper valve.

As a result, since machining is unnecessary, such as boring machining for preparing the bored oil passage 051 (refer to FIG. 11) on the partition plate member 32, the structure of the partition plate member 32 is simplified. Also, since valve spring plates of one kind can be used as the first valve spring plate 36 and the second valve spring plate 37, the valve spring plate is simplified. Furthermore, coil springs required in the conventional case are not required for pressing the first valve spring plate 36 and the second valve spring plate 37 on the partition plate member 32. Accordingly, the structure of the damper valve 30 is simplified, manufacturing and assembling thereof are facilitated, and manufacturing cost thereof is reduced.

Also, since the outer diameter of the first flat washer 38 pressing the first valve spring plate 36 is made larger than that of the second flat washer 39 pressing the second valve spring plate 37, and the spring force of the first valve spring plate 36 is made stronger than that of the second valve spring plate 37, it is unnecessary to provide means for making the spring force of the first spring plate 36 larger than that of the second spring plate 37 as with another part such as a coil spring, and the proper operation can be obtained relatively easily.

Next, an embodiment of the present invention (embodiment 2) shown in FIGS. 7A to 7C will be explained.

In embodiment 2, the structure of a partition plate member 32 used in the damper valve 30 is different from that in embodiment 1. Since the other structures in embodiment 2 are the same as those in embodiment 1, description thereof will be omitted.

Figure 7A:
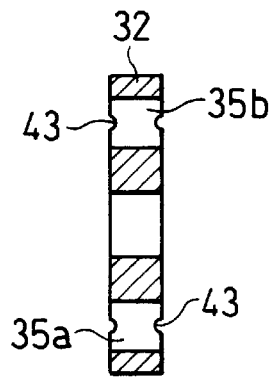
FIGS. 7A to 7C show a structure of a partition plate member used in a damper valve in an embodiment (embodiment 2) of the present invention, where
Figure 7B:
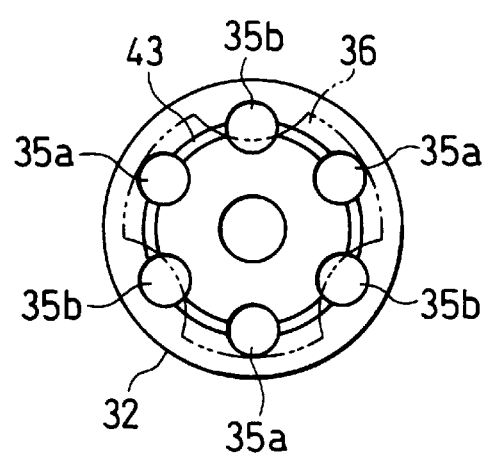
Figure 7C:
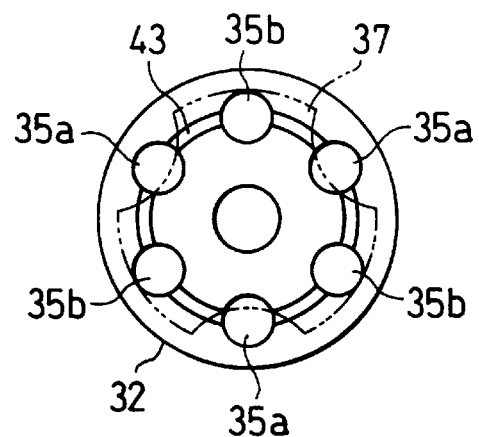

That is, in embodiment 2, as shown in FIGS. 7A to 7C, annular small grooves 43 for causing a plurality of communication holes 35 to communicate with one another are formed on both of one wall face of the partition plate member 32 facing the first valve chamber 33 and the other wall face thereof facing the second valve chamber 34.

As a result, when the first valve spring plate 36 and the second valve spring plate 37 dose every other through holes 35a and the other every other through holes 35b respectively, small flow paths allowing a slight amount of hydraulic oil to flow are formed between these valve spring plates 36, 37 and the respective through holes 35a, 35b.

In this manner, when small flow paths allowing a slight amount of hydraulic oil are formed, hydraulic oil always flows so that the power piston (rack shaft) 8 of the power cylinder 10 is always moved in fine increments and it is put in a standby state of left and right movements. Accordingly, even if an external force such as a force reversing the rack shaft 8 in a sliding manner urgently acts on the rack shaft 8 from the wheel side, the rack shaft 8 is prevented from starting sliding movement at a high speed, so that movement of the rack shaft 8 is made smooth and stability and comfort in steering the steering wheel are maintained.

Figure 10:
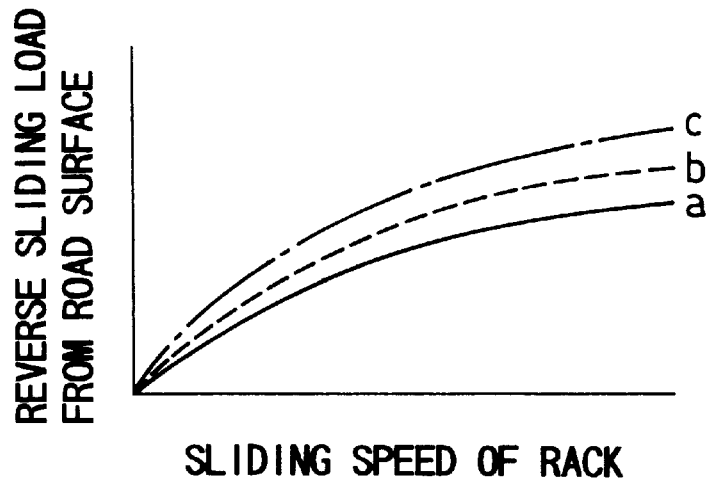
FIG. 10 is a characteristic graph where characteristics of the hydraulic power steering devices of the embodiments 1 to 5 are compared with that of a conventional example.

The above matter will be explained with reference to FIG. 10. It is assumed here that the rack shaft 8 is subjected to a reverse sliding load from the wheel (road surface) side. As in embodiment 2, the sliding speed in the case that a small flow path is formed (a curve c in the Figure) is smaller than the case that no small flow path is formed (a curve b in the Figure).

The above matter means that, even when the rack shaft 8 is subjected to an urgent reverse sliding load, it is prevented from being moved left and right urgently, and movement of the rack shaft 8 is made smooth. In the Figure, a curve 'a' shows a case that the damper valve 30 is not provided, where the rack shaft 8 is rapidly moved left and right and it is thereby affected significantly by external forces.

Forming a small flow path on the partition plate member 32 by such an annular small groove 43 is carried out more easily than forming the bore oil path 051 (refer to FIG. 11) on the conventional partition plate member 032.

Next, an embodiment (embodiment 3) of the present invention shown in FIGS. 8A to 8C will be explained.

In embodiment 3, the shape of a small flow path formed on a partition plate member 32 used in the damper valve 30 is different from that in embodiment 2. Since embodiment 3 is not different in the other points from embodiment 2, description thereof will be omitted.

Figure 8A:
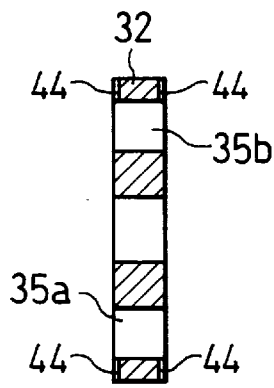
FIGS. 8A to 8C show a structure of a partition plate member used in a damper valve in an embodiment (embodiment 3) of the present invention, where
Figure 8B:
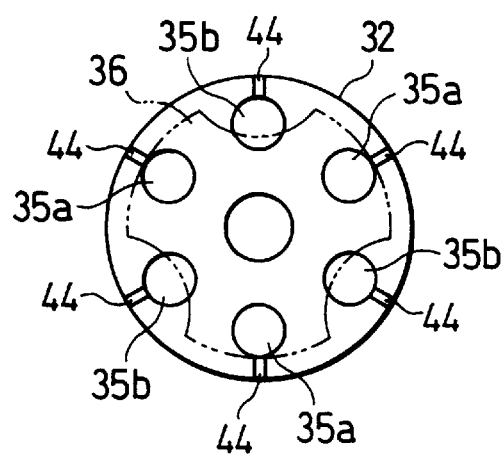
Figure 8C:
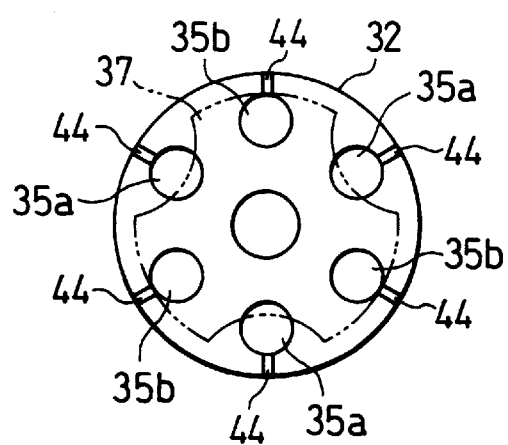

In the embodiment 3, as shown in FIGS. 8A to 8C, small flow paths formed on the partition plate member 32 are respectively formed on both wall faces of the partition plate member 32. They are formed by a plurality of fine grooves 44 for causing the plurality of through holes 35 to communicate with an outer peripheral region of the partition plate member 32. Each fine groove 44 causes each of the plurality of through holes 35 to communicate with a region outside a region where the first valve spring plate 36 covers the one wall face of the partition plate member 32 and a region where the second valve spring plate 37 covers the other wall face thereof.

Effects similar to those obtained by the annular fine groove 43 in the embodiment 2 can also be obtained by such a fine groove 44.

It is to be noted that it is unnecessary to provide the fine grooves 44 on each wall face of the partition plate member 32 corresponding to all the through holes 35. The fine grooves 44 may be formed corresponding to only every other through hole of the through holes 35 covered by the first valve spring plate 36 or the second spring plate 37. As in the embodiment 3, if the fine grooves 44 are formed corresponding to all the through holes 35, when the partition plate member 32 is assembled to the valve casing 31 of the damper valve 30, the former is easily positioned to the latter regarding the peripheral direction thereof.

An embodiment (embodiment 4) of the present invention shown in FIGS. 9A to 9C will be explained.

In embodiment 4, the shape of a small flow path formed on the partition plate member 32 used in the damper valve 30 is different from those in the embodiments 2 and 3. Since the embodiment 4 is not different in the other points from the embodiments 2 and 3, explanation thereof will be omitted.

Figure 9A:
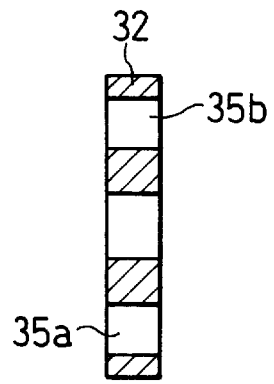
FIGS. 9A to 9C show a structure of a partition plate member used in a damper valve in an embodiment (embodiment 4) of the present invention, where
Figure 9B:
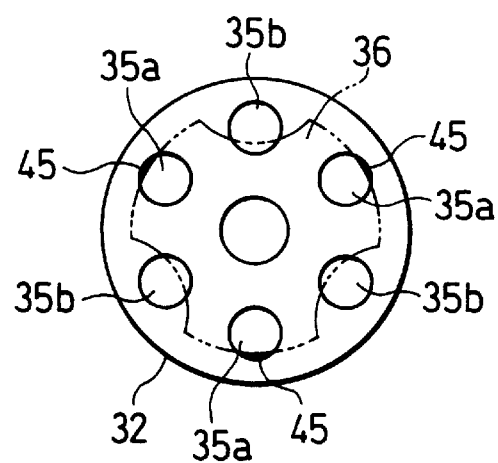
Figure 9C:
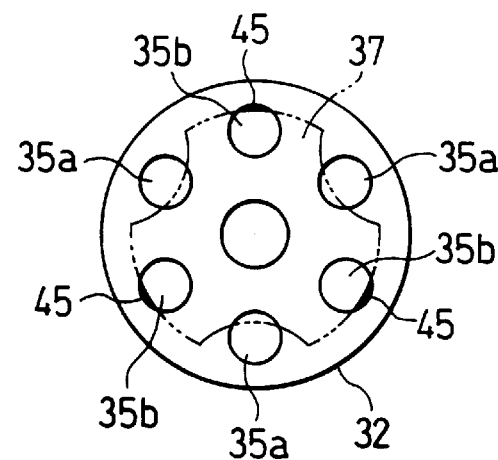

In the embodiment 4, as shown in FIGS. 9A to 9C, small flow paths formed in the partition plate member 32 are formed as gaps 45 (crescent-shaped portions painted with black in FIGS. 9A to 9C) which are portions of openings of the respective through holes 35a, 35b positioned slightly outside projection faces of the valve spring plates 36, 37 to the partition plate member 32, even when the openings are closed by the first valve spring plate 36 and the second valve spring plate 37.

For this reason, virtual diameters of the first valve plate 36 and the second valve plate 37 are formed to be slightly smaller than a virtual diameter obtained by connecting the outermost points of the respective through holes 35 in a curved manner.

An effect similar to the effects obtained by the annular fine groove 43 in the embodiment 2 and the fine groove 44 in the embodiment 3 can also be obtained by such a gap 45.

Furthermore, an embodiment (embodiment 5) of the invention will be explained.

In embodiment 5, means for making a spring force of the first valve spring plate 36 stronger than that of the second valve spring plate 37 is different from that in embodiment 1. As embodiment 5 is not different in the other points from embodiment 1, detailed explanation thereof will be omitted.

In embodiment 5, the means for making a spring force of the first valve spring plate 36 stronger than that of the second valve spring plate 37 depends on identical flat washers being employed as the first flat washer 38 and the second flat washer 39, and the first valve spring plate 36 being made thicker than the second valve spring plate 37. In this case, respective virtual outer diameters of the first valve spring plate 36 and the second valve spring plate 37 are the same.

In this manner the spring force of the first valve spring plate 36 can also be made stronger than that of the second spring plate 37. Thereby, the damper valve in this embodiment can develop the same damper effect as that in embodiment 1.

In embodiments 1 to 5, the damper valve 30 is disposed in the hydraulic oil for connecting the oil passage changing-over valve 6 and the power cylinder 10 to each other, and it is mounted on the casing of the oil passage changing-over valve accommodating portion 2a of the gear box 2, however the present invention is not limited to this configuration. For example, the damper valve 30 may be mounted on a wall face of the power cylinder 10. In this case, the orientation of the partition plate member 32 is reversed in use.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the feature set out in the appended claims.

What is claimed is:

1. A damper valve usable in a hydraulic power steering device the damper valve being disposed in a hydraulic oil circuit, for connecting an oil passage changing-over valve disposed in a gear box and left and right oil chambers of a power cylinder to each other, and which is provided with a partition plate member for partitioning the interior of a valve casing into two valve chambers, comprising;
   a plurality of through holes formed in the partition plate member at equal intervals along a peripheral direction thereof;
   a first valve spring plate for opening/closing every other one of the plurality of through holes fixed to one side wall of the partition plate member facing a first valve chamber of the two valve chambers positioned on a side of the oil passage changing-over valve;
   a second valve spring plate for opening/closing the other every other one of the plurality of through holes fixed to the other wall of the partition plate member facing a second valve chamber of the two valve chambers positioned on a side of the power cylinder; wherein
   the spring force of the first valve spring plate is stronger than the spring force of the second valve spring plate, and
   said damper valve for a hydraulic power steering device arranged and constructed such that when the first valve spring plate and the second valve spring plate close the every other one of the plurality of through holes and the other every other one of the plurality of through holes, respectively, small flow paths allowing a small amount of hydraulic oil to flow are formed between the first and second valve spring plates and respective through holes closed by the first and second valve spring plates.

2. A damper valve usable in a hydraulic power steering device according to claim 1, arranged and constructed such that the small flow paths are formed on both wall faces of the partition plate member, and the small flow paths are annular fine grooves for causing the plurality of through holes to communicate with each other.

3. A damper valve usable in a hydraulic power steering device according to claim 1, arranged and constructed such that the small flow paths are formed on both wall faces of the partition plate member, and the small flow paths are fine grooves formed so as to cause the plurality of through holes to communicate with regions positioned outside a region where the first valve spring plate covers one wall face of the partition plate member, and positioned outside a region where the second valve spring plate covers the other wall face of the partition plate member.

4. A damper valve usable in a hydraulic power steering device according to claim 1, arranged and constructed such that the small flow paths are gaps which are portions of openings of the respective through holes positioned slightly outside projection faces of the first and second valve spring plates to the partition plate member, even when the openings are closed by the first valve spring plate and the second valve spring plate.

5. A damper valve usable in a hydraulic power steering device according to claim 1, wherein identical valve spring plates are employed as the first valve spring plate and the second valve spring plate,
   an outer diameter of a first flat washer for pressing the first valve spring plate is larger than that of a second flat washer for pressing the second valve spring plate, and
   the spring force of the first valve spring plate is stronger than that of the second valve spring plate.

6. A damper valve usable in a hydraulic power steering device according to claim 1, wherein identical valve spring plates are employed as the first valve spring plate and the second valve spring plate,
   an outer diameter of a first flat washer for pressing the first valve spring plate is larger than that of a second flat washer for pressing the second valve spring plate, and
   the spring force of the first valve spring plate is stronger than that of the second valve spring plate.

7. A damper valve usable in a hydraulic power steering device according to claim 2, wherein identical valve spring plates are employed as the first valve spring plate and the second valve spring plate,
   an outer diameter of a first flat washer for pressing the first valve spring plate is larger than that of a second flat washer for pressing the second valve spring plate, and
   the spring force of the first valve spring plate is stronger than that of the second valve spring plate.

8. A damper valve usable in a hydraulic power steering device according to claim 3, wherein identical valve spring plates are employed as the first valve spring plate and the second valve spring plate,
   an outer diameter of a first flat washer for pressing the first valve spring plate is larger than that of a second flat washer for pressing the second valve spring plate, and
   the spring force of the first valve spring plate is stronger than that of the second valve spring plate.

9. A damper valve usable in a hydraulic power steering device according to claim 4, wherein identical valve spring plates are employed as the first valve spring plate and the second valve spring plate,
   an outer diameter of a first flat washer for pressing the first valve spring plate is larger than that of a second flat washer for pressing the second valve spring plate, and
   the spring force of the first valve spring plate is stronger than that of the second valve spring plate.

10. A damper valve usable in a hydraulic power steering device according to claim 1, wherein the first valve spring plate is thicker than the second valve spring plate,
    a first flat washer for pressing the first valve spring plate and a second flat washer for pressing the second valve spring plate are identical flat washers, and
    the spring force of the first valve spring plate is stronger than that of the second valve spring plate.

11. A damper valve usable in a hydraulic power steering device according to claim 2, wherein the first valve spring plate is thicker than the second valve spring plate,
    a first flat washer for pressing the first valve spring plate and a second flat washer for pressing the second valve spring plate are identical flat washers, and the spring force of the first valve spring plate is stronger than that of the second valve spring plate.

12. A damper valve usable in a hydraulic power steering device according to claim 3, wherein the first valve spring plate is thicker than the second valve spring plate, a first flat washer for pressing the first valve spring plate and a second flat washer for pressing the second valve spring plate are identical flat washers, and the spring force of the first valve spring plate is stronger than that of the second valve spring plate.

13. A damper valve usable in a hydraulic power steering device according to claim 4, wherein the first valve spring plate is thicker than the second valve spring plate, a first flat washer for pressing the first valve spring plate and a second flat washer for pressing the second valve spring plate are identical flat washers, and the spring force of the first valve spring plate is stronger than that of the second valve spring plate.

* * * * *